(12) United States Patent
Ohno et al.

(10) Patent No.: US 7,491,887 B2
(45) Date of Patent: Feb. 17, 2009

(54) FOAMING RESIN COMPOSITION, FOAM USING THE SAME AND COAXIAL INSULATED CABLE

(75) Inventors: Takayoshi Ohno, Kasama (JP); Shinya Yamada, Kasama (JP); Masato Yotsuya, Kasama (JP)

(73) Assignee: Junkosha Inc., Fukuda, Kasama-Shi, Ibaraki (JP)

( * ) Notice: Subject to any disclaimer, the term of this patent is extended or adjusted under 35 U.S.C. 154(b) by 84 days.

(21) Appl. No.: 10/597,438

(22) PCT Filed: Jan. 24, 2005

(86) PCT No.: PCT/JP2005/001285

§ 371 (c)(1),
(2), (4) Date: Jul. 25, 2006

(87) PCT Pub. No.: WO2005/070999

PCT Pub. Date: Aug. 4, 2005

(65) Prior Publication Data

US 2008/0087454 A1    Apr. 17, 2008

(30) Foreign Application Priority Data

Jan. 26, 2004    (JP) ................................ 2004-16697

(51) Int. Cl.
*H01B 3/00* (2006.01)
(52) U.S. Cl. ................................. 174/110 F
(58) Field of Classification Search .............. 174/110 F, 174/110 R
See application file for complete search history.

(56) References Cited

U.S. PATENT DOCUMENTS 6,492,596 B1    12/2002   Higashikubo et al.
2002/0156139 A1*  10/2002   Hrivnak ....................... 521/85
2007/0149671 A1*   6/2007   Shiotsuki et al. ............ 524/404

FOREIGN PATENT DOCUMENTS

JP    A-1992-279639    10/1992
WO    WO 03/000792    *  1/2003

* cited by examiner

*Primary Examiner*—Chau N Nguyen
(74) *Attorney, Agent, or Firm*—Collen IP; Donald J. Ranft

(57) ABSTRACT

A foaming composition can be provided which is a fluororesin composition comprising a fluororesin and an electrical insulating whisker and which is foamed by being mixed with a foaming agent to reduce a diameter of cells. Thus, the diameter of cells of the foam obtained by foaming can be reduced. Further, a coaxial insulated cable can be provided in which an insulator layer made of this foam is arranged around a central conductor.

3 Claims, 3 Drawing Sheets

FOAMING RESIN COMPOSITION, FOAM USING THE SAME AND COAXIAL INSULATED CABLE

TECHNICAL FIELD

A foam obtained by foaming a fluororesin-containing composition has been used as an insulation layer of a conductor of a coaxial insulated cable, an insulator layer and a cushioning layer. In a coaxial insulated cable, for example, when a fluororesin-containing foam is used as an insulation layer arranged around a central conductor, a dielectric constant is low in comparison to the absence of a foam layer. Accordingly, high-speed signal transmission is enabled, and attenuation of electrical signals is reduced, making it possible to obtain a cable having excellent properties.

BACKGROUND ART

A foam layer has been formed such that a composition of a fluororesin and the like is melt-molded while being foamed. In the foaming of the fluororesin-containing composition, a gas such as nitrogen has been used as a foaming agent, and boron nitride as a foam nucleating agent. Since a dielectric constant of a foam layer varies with a porosity of a foam layer, it has been required that a foam layer with a low dielectric constant is provided by increasing a porosity.

Boron nitride used as a foam nucleating agent is free from moisture absorption and does not have an adverse effect on electrical characteristics. Thus, it is an advantageous component as a foam nucleating agent used in forming an insulation foam layer of a coaxial insulated cable. However, cells formed are large, and this agent is especially unsatisfactory for forming fine cells required for a coaxial insulated cable in which a wire diameter of a central conductor is small and an insulation layer is thin. Accordingly, a foaming composition capable of forming finer cells and a foam thereof have been in demand.

DISCLOSURE OF THE INVENTION

The subject of the present invention is to provide a foaming composition capable of forming fine cells with a high porosity, a fluororesin-containing foam, and a coaxial insulated cable, in a foam containing fluororesin.

The subject of the invention can be solved by a foaming composition comprising a fluororesin and an electrical insulating whisker.

In the foaming composition, the electrical insulating whisker is at least one selected from aluminum borate, magnesium borate, potassium titanate and silicon nitride.

A synthetic resin foam is a foam obtained by foaming the composition comprising the fluororesin and the electrical insulating whisker upon mixing it with a foaming agent.

A coaxial insulated cable is one in which an insulator layer made of a foam obtained by foaming a composition comprising a fluororesin and an electrical insulating whisker is arranged around a central conductor.

The foaming composition of the invention which is a fluororesin-containing foaming composition is foamed using the whisker as a foam nucleating agent. The resulting foam has fine cells, and a foam layer which is stable mechanically and electrically is obtained, even when the thickness of the foam layer is small. Accordingly, it is possible to provide a foam which is useful as an insulation layer for a coaxial insulated cable requiring a high fidelity.

BEST MODE FOR CARRYING OUT THE INVENTION

Figure 1:
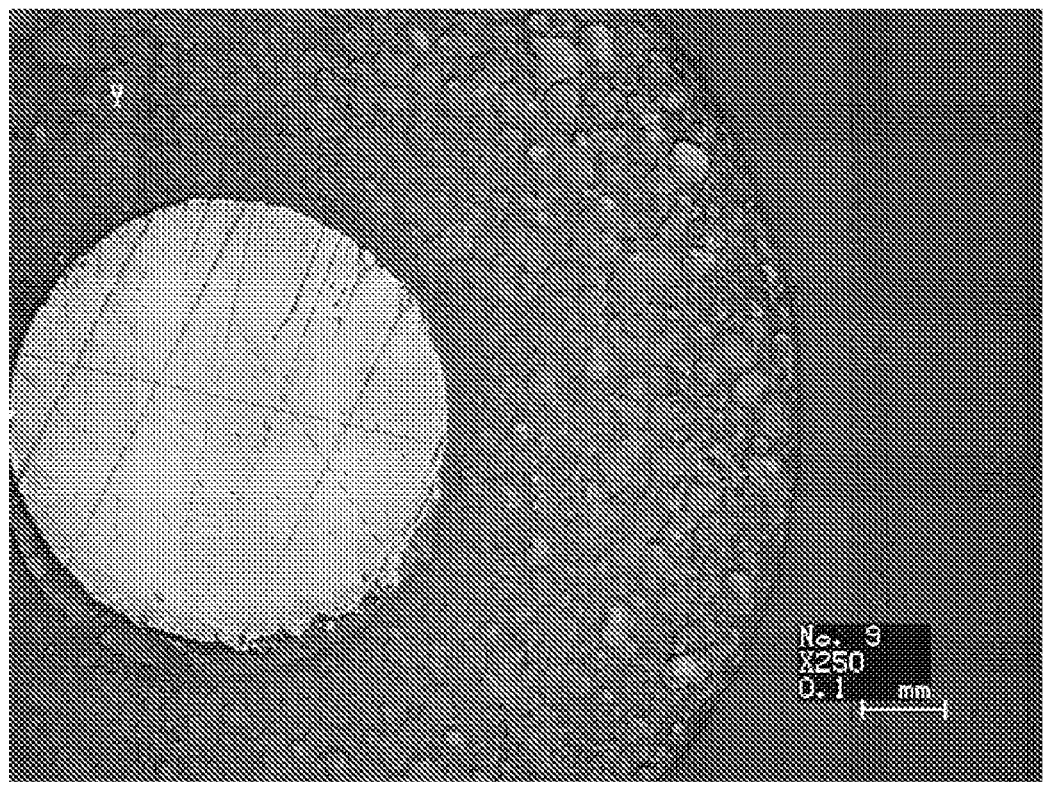
FIG. 1 is a microphotograph describing Example of the invention.

Embodiments according to the invention are described below.

In the invention of this application, it has been found that a foam having fine closed cells is obtained using an electrical insulating whisker as a foam nucleating agent in comparison to the use of boron nitride particles as a foam nucleating agent.

That is, boron nitride has been so far used in the form of particles or scaly grains as the foam nucleating agent. Unexpectedly, it has been found that the use of an insulating whisker makes it possible to form fine cells with a high porosity.

As the whisker which is available as the foam nucleating agent in the invention, an insulating ceramic whisker which does not influence electrical characteristics can be used.

Specific examples of the whisker include an aluminum borate whisker, a magnesium borate whisker, a potassium titanate whisker and a silicon nitride whisker. These may be used either singly or in combination of two or more. For example, as the aluminum borate whisker, Alborex Y (number average diameter of from 0.5 to 1 μm, and number average length of from 10 to 30 μm) manufactured by Shikoku Chemicals is mentioned. As the potassium titanate whisker, Tismo D (number average diameter of from 0.2 to 0.5 μm, and number average length of from 10 to 20 μm) manufactured by Otsuka Chemical can be mentioned.

The insulating whisker in the foaming composition is contained in an amount of, preferably from 0.1 to 5% by weight, more preferably from 0.1 to 1% by weight in the foaming composition.

When the amount of the insulating whisker is less than 0.1% by weight, the foaming rate is decreased, and it is thus undesirable. When it is more than 5% by weight, cells become large, or electrical characteristics are decreased. Thus, it is undesirable.

In the electrical insulating whisker used in the invention, it is preferable that the aspect ratio is from 10 to 100 and the diameter is from 0.1 μm to 1 μm. In a whisker whose values are larger than the foregoing values, fine cells are not formed.

Examples of the fluororesin used in the foaming composition and the foam of the invention can include thermoplastic fluororesins, for example, a tetrafluoroethylene-hexafluoropropylene copolymer, tetrafluoroethylene-alkylvinyl ether copolymers such as a tetrafluoroethylene-perfluoropropylvinyl ether copolymer, an ethylene-tetrafluoroethylene-perfluorobutylethylene copolymer, an ethylene-chlorotrifluoroethylene copolymer, polyvinylidene fluoride and the like.

The foaming of the foam in the invention may be conducted by charging a gas such as nitrogen into a molten composition as a foaming agent or by mixing the foaming resin composition with a foaming substance that generates gas by heat decomposition due to heating.

The invention is illustrated below by referring to Example and Comparative Examples.

EXAMPLE 1

A composition comprising 99.5% by weight of a tetrafluoroethylene-fluoroalkylvinyl copolymer (FEP5100J manufactured by Mitsui du Pont Fluorochemical) and 0.5% by weight of an aluminum borate whisker (Alborex Y manufactured by Shikoku Chemicals) was extrusion-molded with an extruder at a die temperature of 380° C., and 0.52 MPa of nitrogen was charged to form a foam layer with an outer diameter of 1.44 mm on a silver-plated soft copper wire with a diameter of 0.511 mm running on a head mounted on the extruder. Thus, a cover made of the foam layer was formed around a central conductor for a coaxial insulated cable. An electrostatic capacity of the resulting foam layer was measured. A dielectric constant $\in$ was calculated according to the following formula 1, and a porosity V (%) was calculated on the basis of the resulting dielectric constant.

$$\in = (C \times \log(D/d))/24.16 \quad \text{Formula 1}$$

wherein
C: electrostatic capacity per meter (pF)
D: outer diameter (mm)
d: diameter of a conductor (mm)

$$V = (1 - \log \in /\log \in f) \times 100 \quad \text{Formula 2}$$

wherein
$\in f$: dielectric constant of a composition constituting a foam layer before foaming The electrostatic capacity was 75.2 pF/m, the dielectric constant $\in$ 1.400, and the porosity 54.6%, per unit length.

The resulting cover of the central conductor was cut at a surface perpendicular to its axis, and the section was observed through a microscope. The microphotograph is shown in FIG. 1.

An average diameter of 50 cells optionally extracted was 24.2 μm.

Comparative Example 1

A cover of a central conductor having a foam layer was produced in the same manner as in Example 1 except that the foaming composition used in Example 1 was changed to a fluororesin composition (FR5030, manufactured by du Pont) obtained by incorporating boron nitride particles as a foaming agent, and an electrostatic capacity was measured as in Example 1. The electrostatic capacity was 77 pF/m, the dielectric constant $\in$ 1.434, and the porosity 51.4%.

Figure 2:
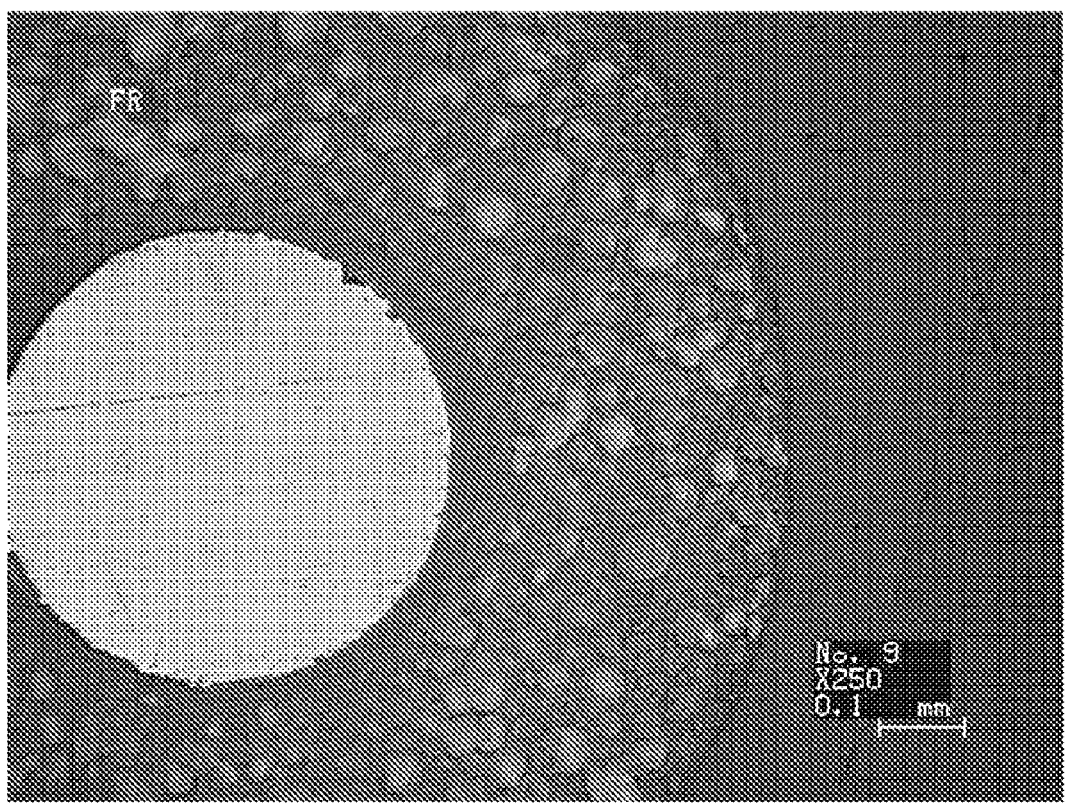
FIG. 2 is a microphotograph describing Comparative Example of the invention.

The resulting cover of the central conductor was cut at a surface perpendicular to its axis, and the section was observed through a microscope. The microphotograph is shown in FIG. 2.

An average diameter of 50 cells optionally extracted was 41.7 μm.

Comparative Example 2

A cover of a central conductor having a foam layer was produced in the same manner as in Example 1 except that the aluminum borate whisker used in Example 1 was changed to aluminum borate particles (Alborite 03T manufactured by Shikoku Chemicals, number average particle diameter 3 μm), and an electrostatic capacity was measured as in Example 1. The electrostatic capacity was 78.5 pF/m, the dielectric constant $\in$ 1.462, and the porosity 48.8%.

Figure 3:
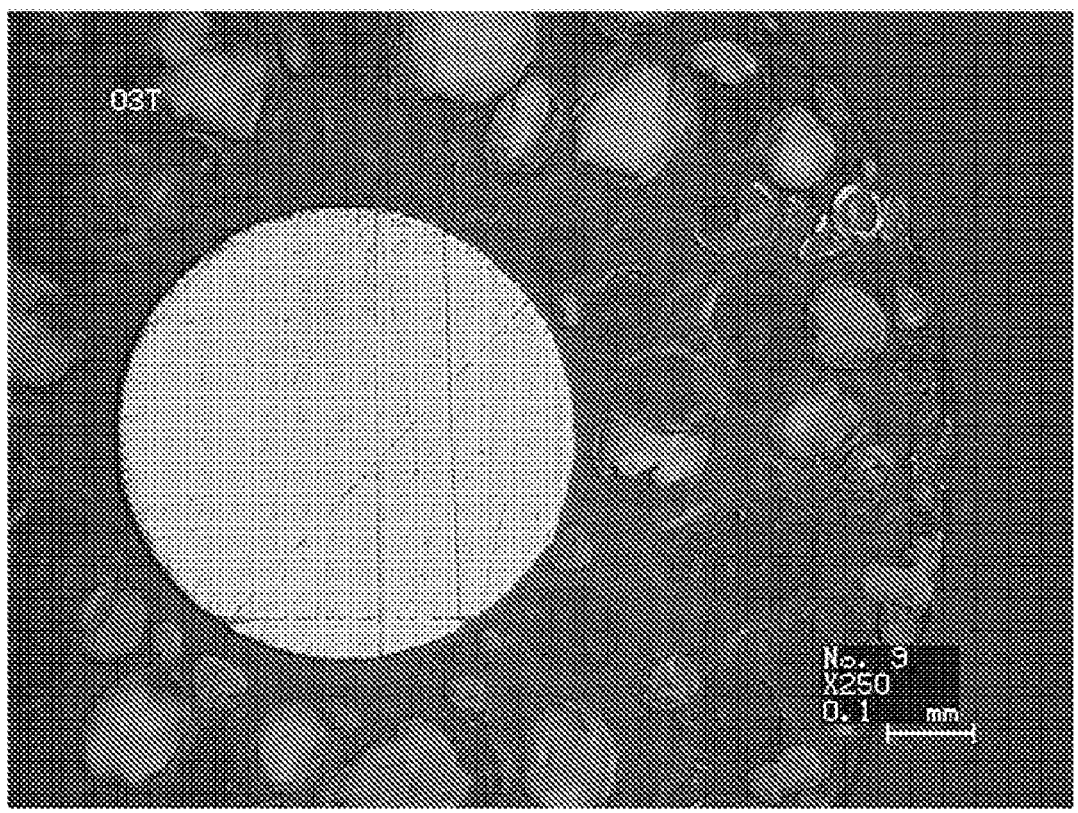
FIG. 3 is a microphotograph describing Comparative Example of the invention.

The resulting cover of the central conductor was cut at a surface perpendicular to its axis, and the section was observed through a microscope. The microphotograph is shown in FIG. 3.

As described in the foregoing Example and Comparative Examples, in the foam layer formed using the whisker of the invention as the foam nucleating agent, it is possible to provide the foam having the low dielectric constant and the small cell diameter in comparison to the use of particles of boron nitride or the like.

INDUSTRIAL APPLICABILITY

The fluororesin-containing foaming composition of the invention contains the whisker as the foam nucleating agent, and the foam obtained by foaming the composition has fine cells. The foam layer having mechanically and electrically stable properties is obtained, even when it is thin. Accordingly, it is advantageous as the insulation layer of the coaxial insulated cable with a small wire diameter requiring a high fidelity.

The invention claimed is:

1. A foaming composition comprising a fluororesin and an electrical insulating whisker, wherein the electrical insulating whisker is at least one selected from aluminum borate, magnesium borate and potassium titanate, and the whisker is from 0.1 μm to 1 μm in a diameter and further the whisker in the foaming composition is contained in an amount of from 0.1 to 1% by weight.

2. A foaming composition according to claim 1 wherein it is mixed with a foaming agent to create a synthetic resin foam.

3. A foaming composition according to claim 1 wherein the composition is arranged around a central conductor creating a coaxial insulated cable.

* * * * *